United States Patent Office 3,728,099
Patented Apr. 17, 1973

3,728,099
METHOD FOR THE TREATMENT OF SEEDS
James William Chiles, Jr., 1710 7th St.,
Clarksdale, Miss. 39614
No Drawing. Continuation-in-part of application Ser. No.
667,085, Sept. 12, 1967, now Patent No. 3,617,247.
This application Mar. 1, 1971, Ser. No. 111,027
The portion of the term of the patent subsequent to
Nov. 2, 1988, has been disclaimed
Int. Cl. A01n 21/02
U.S. Cl. 71—77
18 Claims

ABSTRACT OF THE DISCLOSURE

A method is disclosed for increasing the yield of seedlings emerging from seeds in soil and stimulating the growth of said seedlings by contacting the seeds with a growth-enhancing amount of a compound comprising a carbamylalkenyl phosphorous ester, preferably the dimethyl phosphate of 3-hydroxyl-N-methyl-cis-crotonamide. The growth-enhancing compounds can be applied to the seeds in conjunction with known fungicides, such as, the compound O,O-diethyl-S-2(ethylthio)ethyl phosphorodithioate. The method not only accelerates the growth of the seedlings, but also increases the yield of harvestable crop. The method is particularly suited to the treatment of cottonseeds.

---

This application is a continuation-in-part of my copending application Ser. No. 667,085, filed Sept. 12, 1967, which issued Nov. 2, 1971 as U.S. Pat. No. 3,617,247.

BACKGROUND OF THE INVENTION

This invention relates to a method for increasing the yield of seedlings emerging from seeds in soil and stimulating the growth of said seedlings. In particular, this invention is directed to the treatment of agronomic seeds, particularly cottonseeds, whereby such seeds are provided with a coating which penetrates the surface comprising carbamylalkenyl phosphorous-containing esters, especially the dimethyl phosphate of 3-hydroxy-N-methyl-cis-crotonamide. The invention also relates to coating seeds with known fungicides in conjunction with the aforementioned phosphate esters.

In the past, seeds have been treated with various materials to protect same from the ravages of fungi and insects. Such treatments, however, due to the known phytotoxicity of many fungicides and most insecticides, generally result in only limited protection of the seed and the resulting seedling from insect and fungi infestation and also ultimately result in an at least partial reduction of the number of seedlings obtained from the planting. In other words, the number of seedlings resulting from the planting of a specified amount of fungicide or insecticide treated seeds is usually less than the number of seedlings resulting from untreated seeds planted in essentially fungus-free ground. The number of such seedlings in such instance is, however, appreciably greater than the number of seedlings resulting when untreated seeds are planted in ground containing fungi in significant quantities and in areas where deleterious insect pests are localized. Also, the weight of the resulting seedlings and the yield harvestable crop are generally diminished by the treatment of the seeds with fungicides and insecticides. One means generally employed to overcome this problem of diminished harvestable crop caused by fungicidal and/or insecticidal treatment of seeds is to spray the soil where the untreated seeds are planted. This method, however, also has several disadvantages. For example, many states maintain a restriction on the spraying of many insecticides and fungicides particularly the mercury containing fungicides and the phosphate ester containing insecticides. Additionally, many of the active phosphate ester insecticides, including the dimethyl phosphate of 3-hydroxy-N-methyl-cis-crotonamide are unstable in the soil and are ineffective shortly after application to the soil.

In some instances, seeds have been treated with insecticides and growth accelerators such as gibberellic acid in an attempt to protect the seed and, at the same time, increase the speed of germination and the rate of initial growth. Such treatments, however, also have a tendency to result in a smaller number of seedlings in comparison with the number of seedlings resulting from untreated seeds.

Accordingly, it would be extremely beneficial to the agriculture industry to have a method for the treatment of agronomic seeds with an insecticide and possibly in combination with fungicides which protects the seeds and seedlings from insects, fungi, and also acts to accelerate the growth of the seedling and increase the amount of the ultimate crop harvested.

SUMMARY OF THE INVENTION

It is one object of the present invention to overcome the foregoing drawbacks by coating seeds with carbamylalkenyl phosphorous-containing ester insecticides which act not only in their known insecticidal capacity, but increase the yield of seedlings emerging from the treated seeds in the soil and stimulate the growth of the seedlings to produce an increased ultimate yield of the crop planted.

A further object of the invention is the provision of a method of treating seeds with a carbamylalkenyl phosphorous-containing ester insecticide and a fungicide in order to render the seeds resistant to insects, fungus and/or other parasite infestation and to increase the yield of seedlings resulting therefrom, as well as to stimulate the growth of the seedlings and increase the ultimate yield of crop planted.

The above objects, and other objects which will become apparent to those skilled in the art, are attained by the present invention wherein seeds are treated with an insecticidal composition comprising carbamylalkenyl phosphorous-containing esters characterized by the formula:

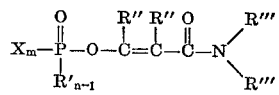

wherein X is a member of the class of radicals consisting of RO—, RNH— and $R_2N$— in which R is an alkyl group containing up to 6 carbon atoms, R' is a monovalent hydrocarbon radical; each R" is a member of the class consisting of a hydrogen atom and an alkyl radical; each R''', taken singly, is a member of the class consisting of a hydrogen atom, a monovalent hydrocarbon radical, an alkoxyaryl radical, a cyanoaryl radical, and taken together in combination, a divalent hydrocarbon radical with 4 to 5 saturated carbon atoms in a chain between the two valences; $m$ is an integer of 1 to 2; and $n=3-m$. Thus, for example, R is any alkyl radical of up to 6 carbon atoms such as methyl, ethyl, isopropyl, butyl, etc. R' is any monovalent hydrocarbon radical such as methyl, ethyl, isobutyl, 3-hexyl, decyl, octadecyl, oleyl, propargyl, etc. Each R" is the same or different and is a hydrocarbon atom or a methyl, ethyl or isobutyl group. Taken singly, each R" is the same or different and is a hydrogen atom or any monovalent hydrocarbon radical such as was exemplified for R'. Taken together, the R''''s are a divalent hydrocarbon radical with 4 to 5 saturated carbon atom in a chain between the two valences such as a tetramethylene radical, as in a pyrrolidyl group, or a pentamethylene radical, as in a piperidyl group, and homologues thereof. It will be noted from the above formula that when $m$ is the integer 1, $n-1=1$ and the compound is a phosphate; and that when $m$ is the integer 2, $n-1=0$ and the compound is a related phosphate. Preferably, the compounds have alkyl groups as the hydrocarbon radicals, and it is further preferred that the compounds be derivatives of N,N-dialkyl alpha-chloroacetoacetamide.

DESCRIPTION OF THE PREFERRED EMBODIMENTS

Insecticidal compositions having the above-described essential ingredient are more particularly disclosed in U.S. Pat. No. 2,802,855 to Richard R. Whetstone and Allen R. Stiles and U.S. Pat. No. 3,258,394 to Walter E. Hall and Donald D. Phillips. As disclosed in these patents, the insecticidal compositions utilized in the present invention are prepared by reacting an appropriate phosphonite or phosphite with an α-chloro, β-oxo fatty acid amide. The complex aryl phosphonate insecticides utilized in accordance with the present invention are ordinarily liquids at ambient temperature and pressure. The compounds are disclosed as having particular utility as insecticides since they are characterized by outstanding properties when employed as contact insecticides. The compounds are highly toxic to insects, i.e., members of the class Insecta and related or similar organisms belonging to related classes of Arthropods and including mites, ticks, spiders, wood lice, thrips and the like.

The insecticidal compounds utilized for treating seeds in accordance with the present invention may be applied to the seeds by spraying or may be otherwise applied in the form of a solution, suspension or dispersion. Further, these solutions may be applied by brush, dipping and the like and can be prepared in the form of solutions by utilizing well-known insect organic horticultural carriers including hydrocarbons, acetone and nonphytotoxic oils of intermediate viscosity and volatility. It is to be understood, of course, that adjuvants such as spreading or wetting agents can also be employed in the preparation of solutions or water suspensions. Illustrative materials of this character include fatty acid soaps, long-chain fatty alcohols, alkyl aryl sulfonates, long-chain alkyl sulfonates and the like. These solutions can be employed as such for dipping purposes or may be dispersed or emulsified and applied to the seeds in the form of a spray. The insecticide composition penetrates the surface of the seed so that the exterior of the seeds is dry in appearance within about 30 minutes after treatment.

The concentration of the insecticidal compounds utilized as seed treating reagents is dependent upon many factors, including the particular compound utilized, the seed employed the method and condition of application and the insect species to be controlled. Such considerations, however, are within the skill of those versed in horticultural-insecticidal art. In general, however, it is recommended that the compounds utilized in the treatment of seeds in accordance with the present invention be applied in an amount to effect growth-enhancing, preferably in concentrations of from about 0.01 to 2% based upon the total weight of the seed treated although as little as about 0.001% or as much as 5% or more of the compound may be employed with good results. A preferred concentration is from about 0.1 to about 5 pounds of the described insecticide per 100 pounds of seed, and, more particularly, a concentration in the range of from 0.04 pound to 1 pound carbamylalkenyl phosphorous ester per 100 pounds of seed.

The carbamylalkenyl phosphorous - containing ester compounds utilized in the method of this invention can be employed either as the sole active ingredient of the growth-enhancing and insecticidal composition or it may be employed in conjunction with other insecticidal or fungicidal materials, such as the compound having the chemical name, O,O-diethyl-S-(ethylthio)ethyl phosphorodithioate and referred to by the trade name "Di-Systion," which is an insecticide, miticide, and/or fungicide as will appear from Lorenz et al. U.S. Pat. No. 2,759,010, and Farbenfabriken Bayer French Pat. No. 1,421,510, patented Nov. 8, 1965, to which Hans Scheinplug et al. U.S. Pat. No. 3,459,857, corresponds. The remaining thiol- or thionothiol-phosphoric (-phosphonic) acid esters disclosed in the foregoing patents which generically embrace the compound referred to as "Di-Syston" may be also used in conjunction with the carbamylalkenyl phosphorous-containing esters. The thiol- or thionothiol-phosphoric (-phosphonic) acid esters can be represented by the general formula:

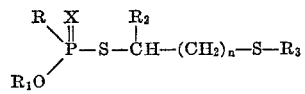

in which R is selected from the group consisting of alkyl, alkoxy, cycloalkoxy, and aryl radicals, $R_1$ is an alkyl radical, $R_2$ is selected from the group consisting of hydrogen and lower carboalkoxy radicals, $R_3$ is an alkyl radical, X is selected from the group consisting of oxygen and sulfur, and $n$ is a whole number having a value from 0 to 1.

Of course, most of the other known fungicide materials which are used to treat seeds in the normal fungicidal manner may be used in conjunction with the carbamylalkenyl phosphorous-containing esters to produce excellent growth-enhancing in the resulting seedlings and plants of the treated seeds. Broadly speaking, most any fungicide which is referred to as systemic or contact fungicide may be used in combination with the carbamylalkenyl phosphorous-containing esters in accordance with the practice of this invention. By systemic fungicidal composition it is meant to include those fungicides which penetrate into the seed or seedling and are disseminated (trans-located) therein without inquiry to the plant, but still act effectively as fungicides. Examples of systemic fungicides which may be used in combination or in conjunction with the carbamylalkenyl phosphorous-containing ester compounds, besides the thio-phospho acid esters, such as the compound O,O-diethyl-S-(ethylthio) ethyl phosphorodithioate("Di-Syston") include the compounds known by the chemical names: 1,4-dichloro-2,5-dimethoxybenzene, also known by the trademark, "Demosan 65–W" and 2,3-dihydro-5-carboxanilido-6-methyl-1,4-oxathin, also known by the trademark, "Vitavax." Typical contact fungicides which may be used with the carbamylalkenyl phosphorous-containing ester compounds are the compounds of the chemical names: zinc, manganese and sodium salts of ethylenebisthiocarbamate; bis-(dimethylthiocarbamyl) disulfide; zinc polyethylenethiuram disulfide complex, also known by the trademark, "Polyram"; zinc trichlorophenate; the monosodium salt of hexachlorophene with 20% E.C., also known by the trademark, "Isobac," the chemical formulation known by the trademark, "Terracoat L–21" which contains 22.7% pentachloronitrobenzene (PCNB) and 11% 5-ethoxy - 3 - trichloromethyl - 1,2,4 - thiodizole, the latter known by the trademark, "Terrazole," all of which are admixed in a hydrocarbon solvent; the mercury containing fungicides (also referred to as mercury disinfectants) including the compound methylmercuric dicyandiamide, also known by the trademark, "Panogen 15," the chemical formulation of methylmercury dicyandiamide and pentochloronitrobenzene, known by the trademark, "Panocoat F"; the chemical formulation of 2.8% methyl mercury-2,3-dihydroxypropylmercaptide and 0.62% methyl mercuric acetate (2.25% Hg), known by the trademark "Ceresan L," and the chemical formulation of 72% concentration of 2 - (thiocyano methylthio)benzothiazole, known by the trademark, "Busan 72."

The foregoing fungicidal materials may be used either alone, with the carbamylalkenyl phosphorous-containing esters or in conjunction with other fungicides. As it is well known in the seed treating art, most commercially available cottonseeds are pretreated with a mercury containing compound as a fungicide-disinfectant, i.e., the "Panogens"

or "Ceresans." Thus, it is to be understood that the invention is meant to include these materials by implication as well as the use of the other known fungicides. For example, the foregoing fungicidal materials referred to by the trademarks, "Demosan 65W" and "Ceresan L" may be used together with the carbamylalkenyl phosphorous-containing esters in treating the seeds to produce excellent growth-enhancing results. Other combinations which have been found in achieving growth-enhancing of the seedlings and high harvestable yields of the crop from the treated seeds include admixing the preferred carbamylalkenyl phosphorous containing ester, i.e., the dimethyl phosphate of 3-hydroxy-N-methyl-cis-crotonamide, dissolved in acetone known by the trademark "Azodrin," with one of the mercury containing fungicide (such as the composition known as "Panogen 15," plus "Demosan 65W," "Terracoat L-21," and/or "Panocoat F," and the mixture comprising "Panogen 15," "Vitavax 735D" with "Azodrin." Particularly advantageous growth-enhancing and high harvestable yields are obtained by coating the seeds with a composition comprising the preferred growth-enhancing insecticide of this invention, "Azodrin," and either one of the systemic fungicides, "Vitavax 735D" or "Demosan 65W." This combination, quite unexpectedly produces better fungicidal protection of the seeds and seedlings as compared to seeds which are only treated with either of the fungicides alone. The reason for the enhanced fungicidal protection is that the insecticide, "Azodrin," i.e., the dimethyl phosphate of 3-hydroxyl-N-methyl-cis-crotonamide in acetone, enables the fungicide to act as a systemic. This phenomenon occurs because of the solvent action of "Azodrin" on the fungicide which in turn permits both the active ingredients, i.e., the insectide and the fungicide to penetrate the seed coat.

The carbamylalkenyl phosphorous-containing ester insecticides may be combined in any suitable manner with the foregoing fungicidal materials. Since the carbamylalkenyl phosphorous-containing esters are generally available in a liquid diluent, such as acetone, many of the fungicides, such as the compounds 1,4-dichloro-2,5-dimethoxybenzene and 2,3-dihydro-5-carboxanilido-6-methyl-1,4-oxathin, (known as "Demosan 65W" and "Vitavax 735D"), which are in powder form may be mixed directly and dissolved or dispersed in the diluent without the need of first suspending the fungicidal power in water prior to coating the seeds.

The concentration of rate of application of the fungicidal compositions to be utilized with the insecticidal compounds as seed treating reagents is dependent upon many factors, including the particular compounds utilized, the seed employed, the method and condition of application, the insecticide compound utilized and the fungi to be controlled. Such considerations, however, are within the skill of those versed in the horticultural-insecticidal-fungicidal art. In general, however, it is recommended that the fungicidal compounds utilized in the treatment of seeds in accordance with the practice of the present invention be applied in an amount to affect growth-enhancing, e.g., from about 0.01 to 1.0 percent by weight of the total amount of seed treated, preferably from about 0.1 to 0.5 percent by weight of the seed treated.

Although the most outstanding results, with regard to the unexpected combination of insecticidal and yield increasing properties, has been demonstrated on cottonseed, it is not intended that the invention be restricted thereto. For instance, the treating method of this invention may be applied to seeds of such nature as rice, soybeans, peanuts, southern peas, wheat, oats, sunflowers, potatoes, etc.

The following illustrative examples of certain preferred embodiments of the invention will serve to more fully illustrate the full scope of the invention and it is understood that the invention is not to be limited thereby. The following examples will illustrate the unexpected combination of insect regulation and increased yield by the treatment of cottonseeds with the insecticidal compositions described hereinabove. Comparative data is shown with regard to seeds treated with other known insecticides and with regard to untreated seeds.

Example 1

Four side by side plots were planted with cottonseed which had been: (1) coated with the peferred carbamylalkenyl-phosphorous-containing ester as described hereinabove, i.e., "Azodrin" (an insecticide containing as the active ingredient the dimethyl phosphate of 3-hydroxy-N-methyl-cis-crotonamide in acetone); (2) coated with "Bidrin" (an insecticide containing as the active ingredient 3 - (dimethoxyphosphinyloxy)-N,N-dimethyl-cis-crotonamide); and (3) two controls of untreated cottonseed separating the plots containing treated cottonseeds. The cottonseeds were sprayed in a concrete mixer at a rate calculated to apply 0.8 pound of "Bidrin" per 100 pounds of seed and the same concentration of "Azodrin," the dimethyl phosphate of 3-hydroxy-N-methyl-cis-crotonamide. The planting rate was 22 pounds of seed per acre, so that the effective rate per acre of applied chemical is 0.176 pound per acre of seeds planted. Insect control was outstanding. Table I illustrates the unexpectedly increased yield of the cottonseed treated with the insecticidal compositions utilized in the present invention.

TABLE I

| Plots | Coating | Yield, pounds per acre |
|---|---|---|
| 1 | (A) Untreated cottonseed (control No. 1) | 792 |
| 2 | "Bidrin" treated cottonseed | 891 |
| 3 | (B) Untreated cottonseed (control No. 2) | 594 |
| 4 | "Azodrin" treated cottonseed (dimethyl phosphate of 3-hydroxy-N-methyl-cis-crotonamide). | 1,320 |

It is apparent from the above data that in addition to the normal insect-controlling properties of the insecticidal compositions utilized in the present invention, there were obtained yield increases of approximately 67%, approximately 48% and approximately 122%, respectively, of the yield produced in accordance with Control No. 1, "Bidrin" and Control No. 2.

Further, it is seen that (A) seeds treated with "Bidrin" resulted in an increase in yield of about 11% but that (B) seeds treated with the insecticide utilized in the present invention resulted in an increase of yield of about 122%. Such an increase is totally unexpected.

Example 2

In a test for thrip control on seeding cotton, delinted Carolina Queen cottonseed was treated with the dimethyl phosphate of 3-hydroxy-N-methyl-cis-crotonamide at the rate of 0.4 pound of the insecticide per 100 pounds of cottonseed. Fourteen pounds of the treated seed per acre were hill-dropped at a rate calculated at 0.06 pound of insecticide per acre. During the period of growth thrips were severe but there were no thrips or thrip damage on the cotton plants grown from the insecticide treated seeds. The treated seeds produced vigorous seedlings which fruited earlier than comparable untreated cotton. The big leaves and cleaned buds indicated healthy plant conditions. Table II below, illustrates the yield in pounds per acre of cotton obtained from untreated cottonseed and from cottonseed treated in accordance with the invention at a rate calculated to achieve 0.06 pound of insecticide per acre.

TABLE II

Control: Pounds per acre
    Untreated cottonseed _____ 656
    Treated cottonseed _____ 934

The above data illustrates that the treated seed produced a yield approximately 42% greater than the yield obtained from untreated cottonseed.

Example 3

This example illustrates an experiment of treating cottonseed before planting for the control of aphids, thrips, and other sucking insects on the seedling cotton. Mechanically delinted Stoneville 213 cottonseed was mixed with a dispersion of 1.06 pounds of the dimethyl phosphate of 3-hydroxy-N-methyl-cis-crotonamide per 100 pounds of cottonseed and planted at the rate of 23 pounds of seed per acre. The insecticide dosage was 0.25 pound per acre. The seed treatment was compared with a control which was treated with a standard herbicide (a suspension containing "Diuron," a substituted urea type herbicide) at a rate of 0.2 pound per acre. No adverse effect on the plants was noticed as a result of the seed treatments. The seed treated in accordance with the invention exhibited excellent control for thrips and plant growth respond was excellent. Although spider mites had created problems in the treated fields in previous years, such problems did not occur in the field sown with the cottonseed treated with the insecticide utilized in the invention. Table III, below, illustrates the yield of cotton obtained in pounds per acre with the herbicide-treated control and the seed treated with insecticides of the invention.

TABLE III

| | |
|---|---|
| Control | 795 |
| Treated seed | 1028 |

The above data illustrates that the cottonseed treated in accordance with the invention resulted in an increased yield of approximately 42% over the seed treated only with the above-described herbicide.

Example 4

Acid delinted Stoneville 213 cottonseed was treated with 0.8 pound of the dimethyl phosphate of 3-hydroxy-N-methyl-cis-crotonamide per 100 pounds of cottonseed. The seed was planted the same day and the rate of insecticide per acre of treated seed was 0.1 pound per acre.

The yield from the above planting was compared with a planting of the same seed treated in a conventional manner by injection of an equivalent amount of Di-Syston, the trade name for a compound of the chemical name O,O-diethyl-S-(ethylthio)ethyl phosphorodithioate, which is an insecticide, miticide and/or fungicide as will appear from Lorenz et al. U.S. Pat. No. 2,759,010 and Farbenfabriken Bayer French Pat. No. 1,421,510, patented Nov. 8, 1965, to which Hans Scheinpflug et al. U.S. Pat. No. 3,459,857, corresponds, and a liquid fertilizer three inches on either side of the drill roll.

The yields of the above plantings were compared with an untreated control planting. The results are summarized in Table IV, below.

TABLE IV

| Lot | Treatment | Yield, pounds per acre |
|---|---|---|
| 1 | Control | 624 |
| 2 | Di-syston/fertilizer treatment | 705 |
| 3 | Dimethyl phosphate of 3-hydroxy-N-methyl-cis-crotonamide | 875 |

The data of Table IV illustrates that the seeds treated in accordance with the invention produced a yield increase of about 29% over the control and about 20% over the comparative insecticide/fertilizer treatment.

Example 5

In this Example, side by side rows were planted with mechanically delinted cottonseeds of the Stoneville 213 variety which had been pretreated with a mercury disinfectant at the rate of 3 oz. per 100 pounds of seed, i.e., the disinfectant known by the trademark "Ceresan L," which contains as active ingredients 2.8% methylmercury-2,3-dihydroxypropyl mercaptide and 0.62% methylmercuric acetate (2.25% Hg). The pretreated seeds were divided into 10 pound lots and each lot of seeds were treated with the chemical treatment indicated in Table V, except for the control lot which was only pre-treated with the aforementioned disinfectants.

A suitable amount of the concentrate of each of the indicated chemicals were diluted in water to make equal volumes of treating material. The treating material was then uniformly applied to the 10 pound lots of the pretreated seeds at the rate of 0.5 pound of active treating chemical per one hundred pounds of cottonseed by spraying the seeds in a concrete mixer. After all of the treating chemical had been sprayed on the seeds, the seeds were allowed to rotate in the concrete mixer for an additional few minutes to assure uniform application. The seeds were then removed from the concrete mixer and allowed to air dry at ambient temperatures.

The dried, treated seeds were planted in hills 12 inches apart in rows 300 feet long at the rate of 5-6 seeds per hill. The results of the test are given in Table V. The active chemicals of each of the trademarks listed under Treating Chemical are provided in the footnotes following the table.

TABLE V

| Treating chemical | | Emergence (14 days after planting)/13 ft. | Stand, count/ 13 ft. | Plant heights (inches) | Weight of 10 plants (gms.) | Yield seed cotton 7 mos. after planting (lbs.)/acre |
|---|---|---|---|---|---|---|
| Lot | Name | | | | | |
| 1 | Control | 39 | 36 | 6 | 38 | 2,544 |
| 2 | "Azodrin"[1] | 38 | 36 | 9 | 76 | 3,220 |
| 3 | "Di-Syston"[2] | 35 | 30 | 8 | 65 | 2,940 |
| 4 | "Thimit"[3] | 32 | 28 | 8 | 62 | 2,998 |
| 5 | "Bidrin"[4] | 24 | 20 | 7 | 52 | 2,453 |
| 6 | "Cygon"[5] | 18 | 16 | 5 | 28 | 2,170 |
| 7 | "Phosphamidon"[6] | 20 | 16 | 6 | 52 | 2,256 |

[1] The dimethyl phosphate of 3-hydroxy-N-methyl-cis-crotonamide diluted in acetone.
[2] O,O-diethyl-S-2-(ethylthio)ethyl phosphorodithioate (6 pounds of active chemical per gallon in hydrocarbon with an emulsifier.)
[3] O,O-diethyl-S-(ethylthio)methyl phosphorodithioate.
[4] The dimethyl phosphate of 3-hydroxy-N,N-dimethyl-cis-crotonamide.
[5] O,O-dimethyl-S-(N-methylcarbamoylmethyl) phosphorodithioate.
[6] 2-chloro-2-diethylcarbamoyl-1-methylvinyl dimethyl phosphate.

The effectiveness of treating seeds with the dimethyl phosphate of 3-hydroxy-N-methyl-cis-crotonamide as compared to seeds treated with other related insecticides and fungicides in enhancing emergence and ultimate yield of the cotton crop is readily noted from Table V. In this test, the emergence of seedlings from seeds treated in accordance with the practice of the present invention is nearly uneffected when compared to the control; but when seeds are treated with the other known insecticides and fungicides a substantial decrease in the emergence of the seedlings occurs as a result of the seed treatment. The most significant advantage shown is the yield of ultimate crop resulting from the seeds treated in accordance with the practice of this invention. Thus, it can be seen that the plants from seeds treated in accordance with the practice of this invention produced 222 pounds more cotton than the seeds treated with "Thimet," 767 pounds more than seeds treated with "Bidrin," the methyl homologue of "Azodrin," and 676 pounds more than the control lot.

Example 6

This test was conducted to compare the emergence, growth and weight of plants from seeds only pretreated with a disinfectant with pretreated seeds additionally treated with both the dimethyl phosphate of 3-hydroxy-N-methyl-cis-crotonamide ("Azodrin") and various commercially available fungicides. The seeds used in this test were the Stoneville 213 variety cottonseeds which had been delinted with acid.

The treating chemicals were combined and diluted in water to equal volumes and thereafter uniformly sprayed onto pre-weighed lots of cotton-seeds in a small concrete mixer. Each of the measured lots of treating solution (including the control solution) contained 2 oz./cwt. of "Ceresan L" (described in detail in Example 5). The seeds were treated with the specified ingredients by spraying a measured amount of the combined ingredients (including "Ceresan L") into the concrete mixer as the seeds were being tumbled. After all of the treating chemicals had been sprayed into the concrete mixer, the seeds were allowed to tumble for an additional five minutes to assure uniform coating of the treating chemicals onto the respective seed lots. The seeds were then removd from the concrete mixer and allowed to air dry at ambient temperatures prior to planting.

The dried seeds were then planted in 300 feet rows for the purpose of comparison of the various seed treatments. The seeds were planted in hills 16 inches apart at the rate of 5 to 6 seeds per hill. The results of this test were observed about 5 weeks after planting and these results are set forth in Table VI.

TABLE VI

| Treating chemicals, insecticide plus fungicide | Rate, oz./cwt. | Stand count, 13 ft. rows | Plant wt. of 10 plants (gms.) | Plant height (inches) |
|---|---|---|---|---|
| Control | | 24 | 35 | 6 |
| "Azodrin 5"[1] plus "Vivavax 849"[2] | 16+8 | 28 | 106 | 0 |
| "Azodrin 5" plus "Vitavax 735D"[3] | 16+8 | 27 | 104 | 10 |
| "Azodrin 5" plus "Demosan 65W"[4] | 16+10 | 30 | 100 | 11 |
| "Azodrin 5" plus "Panacoat F"[5] | 16+30 | 26 | 88 | 19 |

[1] Dimethyl phosphate of 3-hydroxy-N-methyl-cis-crotonamide (5 pounds of ester per gallon dissolved in acetone).
[2] 2,3-dihydro-5-carboxanilido-6-methyl-1,4-oxathin (75% wettable powder for use on wheat).
[3] 2,3-dihydro-5-carboxanilido-6-methyl-1,4-oxathin (75% wettable powder for use on cottonseed).
[4] 1,4-dichloro-2,5-dimethoxybenzene.
[5] 10% of entachloronitrobenzene (PCNB) and 0.15% methyl mercury dicyandiamide.

The results of this test shows that the seeds treated with both the growth-enhancing insecticide, the dimethyl phosphate of 3-hydroxy - N - methyl-cis-crotonamide in combination with various known fungicides produce plants having substantially greater weight than plants from untreated seeds, i.e., as much as 3 times greater weight than the control plants. Thus, it can be seen that the seeds treated with the combination of treating chemicals in accordance with the practice of this invention produce larger plants than those not treated in accordance with the invention.

Example 7

This test was conducted to compare the growth stimulating effects of sunflower seeds treated with the dimethyl phosphate of 3-hydroxy-N-methyl - cis - crotonamide ("Azodrin") in conjunction with various commercially available and known fungicides with untreated sunflower seeds. The "Azodrin" used in this test contained 5 pounds of the phosphate per gallon and the seeds were treated at the rate of 0.6 pound of the "Azodrin 5" per 100 pounds of sunflower seed in addition to the specified fungicide. The seeds were planted in hills 16 inches apart at the rate of 4 seeds per hill. The seed lots were treated with the admixture of insecticide and fungicide in the same manner described in Example 6 for cottonseed by spraying the combined chemicals in the concrete mixer while the seeds were being tumbled. The results of this test which were observed about 4 weeks after planting are given in Table VII. The specific chemicals in each of the fungicides listed are the same as described in the footnotes following Table VI.

TABLE VII

| Treating fungicide used with "Azodrin 5" | Stand count, 13 ft. row | Plant height (inches) | Plant weight 10 plants (oz.) |
|---|---|---|---|
| Control | 20 | 6 | 6 |
| "Vitavax 735D" | 30 | 12 | 18 |
| "Demosan 65W" | 30 | 11 | 12 |
| "Panocoat F" | 28 | 11 | 10 |

The effectiveness of using various known fungicides in conjunction with the insecticide, "Azodrin" is clearly shown in the table. Also, it is apparent from the foregoing test that the method of the present invention is effective in the treatment of a variety of seeds other than cottonseeds.

Example 8

This test compares the growth-stimulation resulting from the simultaneous treatment of peanuts with the dimethyl phosphate of 3-hydroxy-N-methyl-cis-crotonamide ("Azodrin") at various rates in combination with commercially available fungicides with untreated peanuts. The treatment with "Azodrin" was at the rates of 10, 5, 2.5, 0.25 and 0.10 pounds of active "Azodrin" per 100 pounds of peanuts. The results of the tests which were observed 19 days after planting are given in Table VIII.

TABLE VIII

| Insecticide | Rate | Fungicide | Rate, oz. | Emergence |
|---|---|---|---|---|
| "Azodrin" | 10.0 | None | | 2 |
| Do | 5.0 | do | | 9 |
| Do | 2.5 | "Thiram"[1] | 4 | 20 |
| Do | 2.5 | "Isobac 20"[2] | 6 | 0 |
| Do | .25 | "Thiram" | 4 | 81 |
| Do | .25 | "Isobac 20" | 6 | 92 |
| Control | | do | 6 | 94 |
| "Azodrin" | .10 | do | 6 | 95 |
| Control | | Control | | 94 |
| "Azodrin" | .10 | "Thiram" | 4 | 94 |

[1] Bis(dimethylthiocarbamoyl)disulfide, 98.5%.
[2] Monosodium salt of hexachlorophene, 20% E. C.

The results of this test reveal that the effectiveness of the "Azodrin" is enhanced when smaller amounts of the material are employed in conjunction with a fungicide. Thus, it can be seen that the treatment of 100 pounds of peanuts with 0.1 pound of "Azodrin" is far more effective than using 10 pounds of "Azodrin" alone per 100 pounds of peanuts.

Example 9

In this test mechanically delinted DPL–16 variety cottonseeds were planted in randomized plots. Prior to planting, the cottonseeds of the respective plots were treated with various known fungicides and/or insecticides in the manner previously described in Example 6 with the amounts of material specified to compare the respective seed treatments. In the table, except where otherwise noted, an equivalent of 0.406 pound of chloroneb per cwt. and 0.625 pound of active dimethyl phosphate of 3-hydroxy-N-methyl-cis-crotonamide per cwt. of seed were used to treat the seeds. The amounts of chemicals specified in the table represents the rate of commercial formulation actually sprayed onto the seeds.

The stand counts from six (6) replicates planted with 50 seeds each were observed six weeks after planting. The weight of the plants from 47 seeds were also recorded six weeks after planting. The recorded yields in grams produced by 3 plants in a 2 foot row were made about four and a half months after planting. The replicates recorded from the observations from the test were averaged and a summary of the results of this test are given in Table IX.

The emulsions were applied to the respective seed lots to provide a coating rate of 0.5 pound of the treating chemical per 100 pounds of seed.

The seeds were planted in hills 16 inches apart at the rate of 5-6 seeds per hill in rows 500 feet long. The emergence count was made 14 days after planting and the stand count, plant height and weight per 10 plants were made 42 days after planting. The final yield was made

TABLE IX

| Seed treatment | Rate, oz./cwt. | Average plant stand/50 seed | Average plant wt. from 47 seeds (gms.) | Average yield (gms.) from 3 plants/ 2 feet |
|---|---|---|---|---|
| Control | 0 | 29.5 | 154 | 146 |
| "Busan 72" [1] | 3 | 28.5 | 118 | 143 |
| "Busan 72", "Demosan 65W" [2] | 3, 10 | 29.0 | 109 | 141 |
| "Busan 72", "Demosan 65W" plus "Azodrin 5" [3] | 3, 10, 16 | 30.3 | 152 | 177 |
| "Busan 72", "Vitavax 75" [4] "Azodrin 5" | 3, 16, 16 | 35.7 | 210 | 179 |
| "Demosan", "Azodrin 5" | 10, 16 | 34.7 | 360 | 176 |
| "Demosan", "Azodrin" [5] | 5, 8 | 39.7 | 402 | 203 |

[1] 2(thiocyanomethylthio)benzothiazole (a 72% formulation used at 3 oz./cwt. on mechanically delinted seed and 2 oz./cwt. on acid delinted seed).
[2] 1,4-dichloro-2,5-dimethoxybenzene (65% wettable powder), chloroneb.
[3] Dimethyl phsophate of 3-hydroxy-N-methyl-cis-crotonamide (a 55% formulation in acetone).
[4] 2,3-dihydro-5-carboxanilido-6-methyl-1,4-oxathin (75% wettable powder).
[5] Equivalent of 0.23 lb. chloroneb and 0.31 lb. "Azodrin" (½ pint "Azodrin 5") per 100 pounds of seeds treated.

The results tabulated in the foregoing table clearly establishes the unexpected advantages of the present invention. Thus, it can be observed that the treatment of seeds with "Busan 72" or "Demosan 65W" either alone, or together actually produces detrimental results as compared to the untreated seeds, but by adding the insecticide "Azodrin" to the foregoing materials as a seed treatment, outstanding growth stimulation and yields of the plants were obtained.

about five and a half months after planting. The results of this test are shown in Table X.

TABLE X

| Treating chemicals | Rate per 100 lbs. seeds (lbs.) | Emergence | Stand count | Plant height | Weight of yield 10 plants (grams) | Cottonseed (lbs.) per acre |
|---|---|---|---|---|---|---|
| Control | | 32 | 30 | 5 | 40 | 2,280 |
| "Demosan" | 0.56 | | | | | |
| "Azodrin 2" [1] | 0.5 | 30 | 29 | 10 | 80 | 2,882 |
| "Demosan" | 0.56 | | | | | |
| "Di-Syston" | .5 | 28 | 26 | 8 | 68 | 2,720 |
| "Demosan" | .56 | | | | | |
| "Thimet" [2] | .5 | 28 | 29 | 9 | 70 | 2,769 |
| "Demosan" | .56 | | | | | |
| "Bidrin" [3] | .5 | 21 | 20 | 7 | 54 | 2,354 |
| "Demosan" | .56 | | | | | |
| "Cygon" [4] | .5 | 20 | 18 | 5 | 28 | 2,258 |
| "Demosan" | .56 | | | | | |
| "Phosphamidon" [5] | .5 | 20 | 18 | 6 | 52 | 2,310 |
| "Demosan" | .56 | | | | | |

[1] "Azodrin 2", the dimethyl phosphate of 3-hydroxy-N-methyl-cis-crotonamide, (2 pounds per gallon of chemical in acetone).
[2] "Thimet", O,O-diethyl-S-(ethylthio)methyl phosphorodithioate.
[3] "Bidrin", the dimethyl phosphate of 3-hydroxy-N,N-dimethyl-cis-crotonamide (technical).
[4] "Cygon", O,O-dimethyl-S-(N-methylcarbamoylmethyl) phosphorodithioate.
[5] "Phosphamidon", 2-chloro-2-diethylcarbamoyl-1-methylvinyl dimethyl phosphate.

As it can be seen from the results in the foregoing table, the combination of the insecticide "Azodrin" with systemic fungicides produce growth and ultimate yields of crop superior to all the other combination treatments shown.

Example 11

In this test several plots of acid delinted Stoneville 213 cottonseeds were planted with a template planter which planted the seeds 1.5 inches apart and 1.5 inches deep in the soil. The seeds of each plot had been previously treated with different concentrations of the dimethyl phosphate of 3 - hydroxy - N - methyl- cis - crotonamide (referred to as "Azodrin") in combination with a fungicidal mixture of "Ceresan L" and "Demosan 65W." Each lot of seeds planted including the control lot were treated with 3 oz. per cwt. with "Ceresan L." Other than the control lot each of the remaining lots of seeds were treated at the rate of 10 oz. per cwt. with "Demosan 65W." The "Azodrin" rate specified in the table is the amount of active ingredient applied. The stands were counted about two weeks after planting Example 10

In this test acid delinted cottonseeds were pretreated with a mercury disinfectant at the rate of 2 oz. per 100 pounds of seed, i.e., "Ceresan L," the trademark of a composition containing 2.8% methylmercury-2,3-dihydroxypropyl-mercaptide and 0.62% methylcercuric acetate (2.25% Hg.). The pretreated seeds were thereafter treated with 1,4-dichloro-2,5-dimethoxybenzene at the rate of 12 oz. per 100 pounds of seed with 75 percent wettable powder mixed in a water slurry to provide the rates of technical fungicide shown in Table X.

The seeds were divided into 10 pound lots. Suitable amounts of the insecticides and "Demosan" were diluted with water to provide an equal volume of the emulsion.

and the height and weight of the plants from 100 seeds were made about one month after planting.

The results of the test is given in Table XI.

TABLE XI

| Treatment in addition to "Cereasn L" and "Demosan 65W" | Rate per 100 pounds of seeds (lbs.) | Percent emergence (3 weeks) | Height (inches) | Weight (ounces) |
|---|---|---|---|---|
| Control ("Ceresan L" only) | 0 | 84 | 9.0 | 14 |
| "Azodrin" | 0.3 | 83 | 10.5 | 17 |
| Do | 0.6 | 86 | 11.0 | 20 |
| Do | 1.2 | 88 | 7.0 | 13 |
| Do | 2.5 | 59 | 8.0 | 8 |

The results in the foregoing test demonstrate that the treatment of the invention not only protects the seeds against fungus and insects, the treatment of seeds with both fungicides and the insecticide in accordance with the practice of this invention, produces growth-stimulation with smaller amounts of insecticide.

Thus, it is apparent from the foregoing that the method of the present invention provides excellent growth-stimulation as well as increase in yield of harvestable crop. This result is totally unexpected in view of the usual slight deleterious effect that insecticides and/or fungicides have on seedlings when not used in accordance with the practice of the present invention.

Although this invention has been described in relation to specific embodiments, it will be apparent that obvious modifications may be made by one skilled in the art without departing from the intended scope thereof as defined by the appended claims.

What is claimed is:

1. A method for stimulating the growth of seedlings emerging from seeds in soil and increasing the harvestable crop from said seedlings which comprises contacting said seeds with a composition comprising a growth-enhancing amount of a carbamylalkenyl phosphorous ester and a fungicidally active component containing at least one systemic fungicide.

2. The method as defined in claim 1 wherein at least one of said fungicides is a member selected from the group consisting of O,O-diethyl-S-2(ethylthio)ethyl phosphorodithioate, 1,4-dichloro-2,5-dimethoxybenzene and 2,3-dihydro-5-carboxanilido-6-methyl-1,4-oxathin.

3. The method as defined in claim 1 wherein at least one of said fungicides is O,O-diethyl-S-2(ethylthio)ethyl phosphorodithioate.

4. The method as defined in claim 1 wherein said fungicide is added in the amount ranging from about 0.01 to about 1 percent by weight of the total amount of seed treated.

5. The method as defined in claim 1 wherein said seeds are cottonseeds.

6. The method as defined in claim 5 wherein said phosphorous ester is added in the amount ranging from about 0.04 pound to about 1 pound per 100 pounds of cottonseeds.

7. The method as defined in claim 5 wherein at least one of said fungicides is a member selected from the group consisting of O,O-diethyl-S-2(ethylthio)ethyl phosphorodithioate, 1,4-dichloro-2,5-dimethoxybenzene and 2,3-dihydro-5-carboxanilido-6-methyl-1,4-oxathin.

8. The method as defined in claim 5 wherein at least one of said fungicides is O,O-diethyl-S-2(ethylthio)ethyl phosphorodithioate.

9. The method as defined in claim 5 wherein said fungicide is added in the amount ranging from about 0.01 to about 1 percent by weight of the total amount of seed treated.

10. A method for stimulating the growth of seedlings emerging from seeds in soil and increasing the harvestable crop from said seedlings which comprises contacting said seeds with a composition comprising a growth-enhancing amount of the dimethyl phosphate of 3-hydroxy-N-methyl-cis-crotonamide and a fungicidally active component containing at least one systemic fungicide.

11. The method as defined in claim 1 wherein at least one of said fungicides is a member selected from the group consisting of O,O-diethyl-S-2(ethylthio)ethyl phosphorodithioate, 1,4-dichloro-2,5-dimethoxybenzene and 2,3-dihydro-5-carboxanilido-6-methyl-1,4-oxathin.

12. The method as defined in claim 11 wherein at least one of said fungicides is O,O-diethyl-S-2(ethylthio)ethyl phosphorodithioate.

13. The method as defined in claim 11 wherein said fungicide is added in the amount ranging from about 0.01 to about 1 percent by weight of the total amount of seed treated.

14. The method as defined in claim 11 wherein said seeds are cottonseeds.

15. The method as defined in claim 11 wherein said phosphate is added in an amount ranging from about 0.04 pound to about 1 pound per 100 pounds of cottonseed.

16. The method as defined in claim 15 wherein at least one of said fungicides is a member selected from the group consisting of O,O-diethyl-S-2(ethylthio)ethyl phosphorodithioate, 1,4-dichloro-2,5-dimethoxybenzene and 2,3-dihydro-5-carboxanilido-6-methyl-1,4-oxathin.

17. The method as defined in claim 15 wherein at least one of said fungicides is O,O-diethyl-S-2(ethylthio)ethyl phosphorodithioate.

18. The method as defined in claim 15 wherein said fungicide is added in an amount ranging from about 0.04 pound to about 1 pound per 100 pounds of cottonseed.

References Cited

UNITED STATES PATENTS

| | | | |
|---|---|---|---|
| 2,759,010 | 8/1956 | Lorenz et al. | 424—216 X |
| 2,802,855 | 8/1957 | Whetstone et al. | 260—943 |
| 3,258,394 | 6/1966 | Hall et al. | 424—211 |
| 3,459,857 | 8/1969 | Scheinpflug et al. | 424—215 |
| 3,454,391 | 8/1969 | Von Schmeling et al. | 71—77 |

OTHER REFERENCES

Harris et al.: Research on Systemic Insecticides, Mississippi Farm Research, vol. 33, No. 3, March 1970.

Fungicide and Nematicide Tests Results of 1968, vol. 24, pages 97, 101 and 102 (1968), published by the American Phytopathological Soc.

JAMES O. THOMAS, JR., Primary Examiner

U.S. Cl. X.R.

47—57.6; 71—86